US012664902B2

(12) United States Patent
Vining et al.

(10) Patent No.: US 12,664,902 B2
(45) Date of Patent: *Jun. 23, 2026

(54) OPTIMIZING FLIGHTS OF A FLEET OF AIRCRAFT USING A REINFORCEMENT LEARNING MODEL

(71) Applicant: The Boeing Company, Arlington, VA (US)

(72) Inventors: Kirk A. Vining, Renton, WA (US); Alvin L. Sipe, Kenmore, WA (US); Dragos D. Margineantu, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 116 days.

This patent is subject to a terminal disclaimer.

(21) Appl. No.: 18/827,325

(22) Filed: Sep. 6, 2024

(65) Prior Publication Data

US 2024/0428695 A1 Dec. 26, 2024

Related U.S. Application Data

(63) Continuation of application No. 17/385,366, filed on Jul. 26, 2021, now Pat. No. 12,094,349.

(Continued)

(51) Int. Cl.
*G08G 5/56* (2025.01)
*G06N 20/00* (2019.01)
(Continued)

(52) U.S. Cl.
CPC .............. *G08G 5/56* (2025.01); *G06N 20/00* (2019.01); *G08G 5/34* (2025.01); *G08G 5/50* (2025.01); *G08G 5/55* (2025.01)

(58) Field of Classification Search
CPC .. G08G 5/0043; G08G 5/0039; G08G 5/0047; G06N 20/00
See application file for complete search history.

(56) References Cited

U.S. PATENT DOCUMENTS

2021/0304347 A1* 9/2021 Mueller ................. G06Q 50/47

OTHER PUBLICATIONS

New World Encyclopedia, Air Traffic Control, 2019, newworldencyclopedia.org pp. 2019 (Year: 2019).*

(Continued)

*Primary Examiner* — Aniss Chad
*Assistant Examiner* — Chase L Cooley
(74) *Attorney, Agent, or Firm* — Alleman Hall LLP

(57) ABSTRACT

A method of optimizing flights of a fleet of aircraft is provided. The method includes accessing flight plans for flights of a fleet of aircraft through an air transportation network, tracking positions and trajectories of one or more aircraft of the fleet that are currently in-flight, and applying the flight plans and the positions and trajectories to a reinforcement learning model configured to determine maneuvers that achieves a respective maximum cumulative value of an operational efficiency metric across the flights of the fleet of aircraft, one or more of the maneuvers constituting a deviation from a respective flight plan. A comparison of respective maximum cumulative values of the operational efficiency metric is performed for the aircraft of the fleet of aircraft, one of the aircraft is selected based on the comparison, and a notification of the deviation from the respective flight plan is sent to the one of the aircraft.

20 Claims, 5 Drawing Sheets

Related U.S. Application Data

(60) Provisional application No. 63/094,612, filed on Oct. 21, 2020.

(51) Int. Cl.
| | |
|---|---|
| *G08G 5/34* | (2025.01) |
| *G08G 5/50* | (2025.01) |
| *G08G 5/55* | (2025.01) |

(56) References Cited

OTHER PUBLICATIONS

Shital Sha, Debapeedpta Dey, Chris Lovett and Ashish Kapoor, Air Sim: High-Fidelity Visual and Physical Simulation for Autonomous Vehicles, 2018, Springer, 11, pp. 621-632, 2018 (Year: 2018).*

* cited by examiner

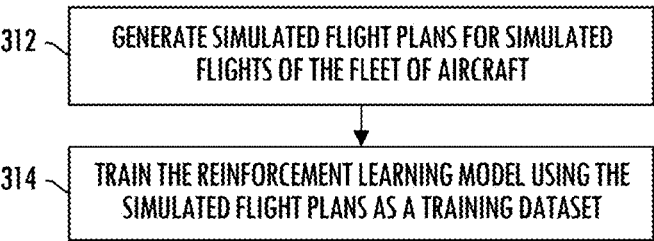

312 — | GENERATE SIMULATED FLIGHT PLANS FOR SIMULATED FLIGHTS OF THE FLEET OF AIRCRAFT

314 — | TRAIN THE REINFORCEMENT LEARNING MODEL USING THE SIMULATED FLIGHT PLANS AS A TRAINING DATASET

FIG. 3B

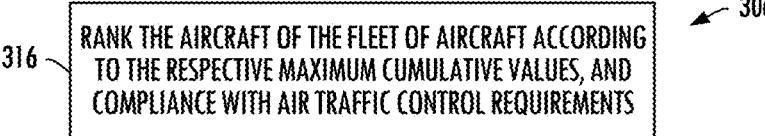

← 306

316 — | RANK THE AIRCRAFT OF THE FLEET OF AIRCRAFT ACCORDING TO THE RESPECTIVE MAXIMUM CUMULATIVE VALUES, AND COMPLIANCE WITH AIR TRAFFIC CONTROL REQUIREMENTS

FIG. 3C

318 — | GENERATE AN UPDATED FLIGHT PLAN FOR THE ONE OF THE AIRCRAFT THAT INCLUDES THE DEVIATION FROM THE RESPECTIVE FLIGHT PLAN

FIG. 3D

320 — | TRACK AT LEAST RESPECTIVE POSITIONS AND RESPECTIVE TRAJECTORIES OF THOSE OF THE AIRCRAFT OF THE FLEET OF AIRCRAFT THAT ARE IN-FLIGHT

FIG. 3E

OPTIMIZING FLIGHTS OF A FLEET OF AIRCRAFT USING A REINFORCEMENT LEARNING MODEL

CROSS REFERENCE TO RELATED APPLICATIONS

This application is a continuation of U.S. patent application Ser. No. 17/385,366, filed Jul. 26, 2021, which claims priority to U.S. Provisional Patent Application Ser. No. 63/094,612, filed Oct. 21, 2020, the entirety of each of which is hereby incorporated herein by reference for all purposes.

TECHNOLOGICAL FIELD

The present disclosure relates generally to aircraft fleet operation and, in particular, to optimizing flights of a fleet of aircraft using a reinforcement learning model.

BACKGROUND

Aircraft today typically travel within an air transportation network, which is a spatial network describing a structure that permits aircraft movement. There exist multiple air transportation networks, including global and regional networks. Many of these air transportation networks are continuously saturated with traffic, and a disturbance at one geographic point can affect aircraft at completely opposite ends of the network. National air traffic control systems attempt to optimize air traffic flow for the entire network, without regard to individual airline efficiencies. Optimization of air traffic for the entire network is typically limited to gross restrictions such as flow control and slot limitations.

There is presently no means for an airline to optimize efficiency for their own fleet by making small changes to the flight trajectory of an individual aircraft in one location that would have an impact across a fleet of their aircraft.

BRIEF SUMMARY

Example implementations of the present disclosure are directed to aircraft fleet operation and, in particular, to optimizing flights of a fleet of aircraft using a reinforcement learning model. The reinforcement learning model may be trained to analyze flight plans and track positions and trajectories of a fleet of aircraft on flights through an air transportation network. The reinforcement learning model may suggest changes in altitude, speed or heading (e.g., temporary heading) for one aircraft that may beneficially impact an operational efficiency metric such as fuel consumption, carbon emissions or flight time across the fleet of aircraft. The suggested changes or deviations may be sent to the one aircraft for use by its pilot or pilots to make a request to air traffic control. The suggested changes may have a marginally small adverse impact on the one aircraft, but create a net positive benefit across the fleet of aircraft.

The present disclosure thus includes, without limitation, the following example implementations.

Some example implementations provide a method of optimizing flights of a fleet of aircraft, the method comprising accessing flight plans for flights of a fleet of aircraft through an air transportation network, each flight subject to compliance with air traffic control requirements; applying the flight plans to a reinforcement learning model configured to determine maneuvers for each aircraft on a respective flight that achieves a respective maximum cumulative value of an operational efficiency metric across the flights of the fleet of aircraft, one or more of the maneuvers constituting a deviation from a respective flight plan that propagates to other aircraft of the fleet of aircraft that are caused to perform responsive maneuvers to maintain compliance with the air traffic control requirements; performing a comparison of respective maximum cumulative values of the operational efficiency metric for the aircraft of the fleet of aircraft; selecting one of the aircraft based on the comparison; and sending a notification of the deviation from the respective flight plan to the one of the aircraft.

In some example implementations of the method of any preceding example implementation, or any combination of any preceding example implementations, the method further comprises generating simulated flight plans for simulated flights of the fleet of aircraft; and training the reinforcement learning model using the simulated flight plans as a training dataset.

In some example implementations of the method of any preceding example implementation, or any combination of any preceding example implementations, the flight plans indicate flight paths of the aircraft of the fleet of aircraft, and the deviation is from one or more of a planned altitude, speed or heading of the aircraft on a respective flight path.

In some example implementations of the method of any preceding example implementation, or any combination of any preceding example implementations, performing the comparison includes ranking the aircraft of the fleet of aircraft according to the respective maximum cumulative values, and compliance with the air traffic control requirements, and wherein the one of the aircraft is selected based on the ranking.

In some example implementations of the method of any preceding example implementation, or any combination of any preceding example implementations, sending the notification includes sending the notification that also includes an explanation for selecting the one of the aircraft.

In some example implementations of the method of any preceding example implementation, or any combination of any preceding example implementations, the flight plans are accessed and applied to the reinforcement learning model, the comparison is performed, and the one of the aircraft is selected, prior to at least the respective flight of the one of the aircraft, wherein the method further comprises generating an updated flight plan for the one of the aircraft that includes the deviation from the respective flight plan, and sending the notification includes sending the updated flight plan to the one of the aircraft.

In some example implementations of the method of any preceding example implementation, or any combination of any preceding example implementations, the flight plans are accessed and applied to the reinforcement learning model, the comparison is performed, the one of the aircraft is selected, and the notification of the deviation is sent to the one of the aircraft, during at least the respective flight of the one of the aircraft.

In some example implementations of the method of any preceding example implementation, or any combination of any preceding example implementations, the method further comprises tracking respective positions and respective trajectories of those of the aircraft of the fleet of aircraft that are in-flight, and wherein applying the flight plans to the reinforcement learning model includes applying the flight plans and the trajectories to the reinforcement learning model configured to determine the maneuvers starting at the respective positions for each of those of the aircraft of the fleet of aircraft that are in-flight.

Some example implementations provide an apparatus for optimizing flights of a fleet of aircraft, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for optimizing flights of a fleet of aircraft, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 3A, 3B, 3C, 3D and 3E are flowcharts illustrating various steps in a method of optimizing flights of a fleet of aircraft, according to example implementations.

DETAILED DESCRIPTION

Figure 1:
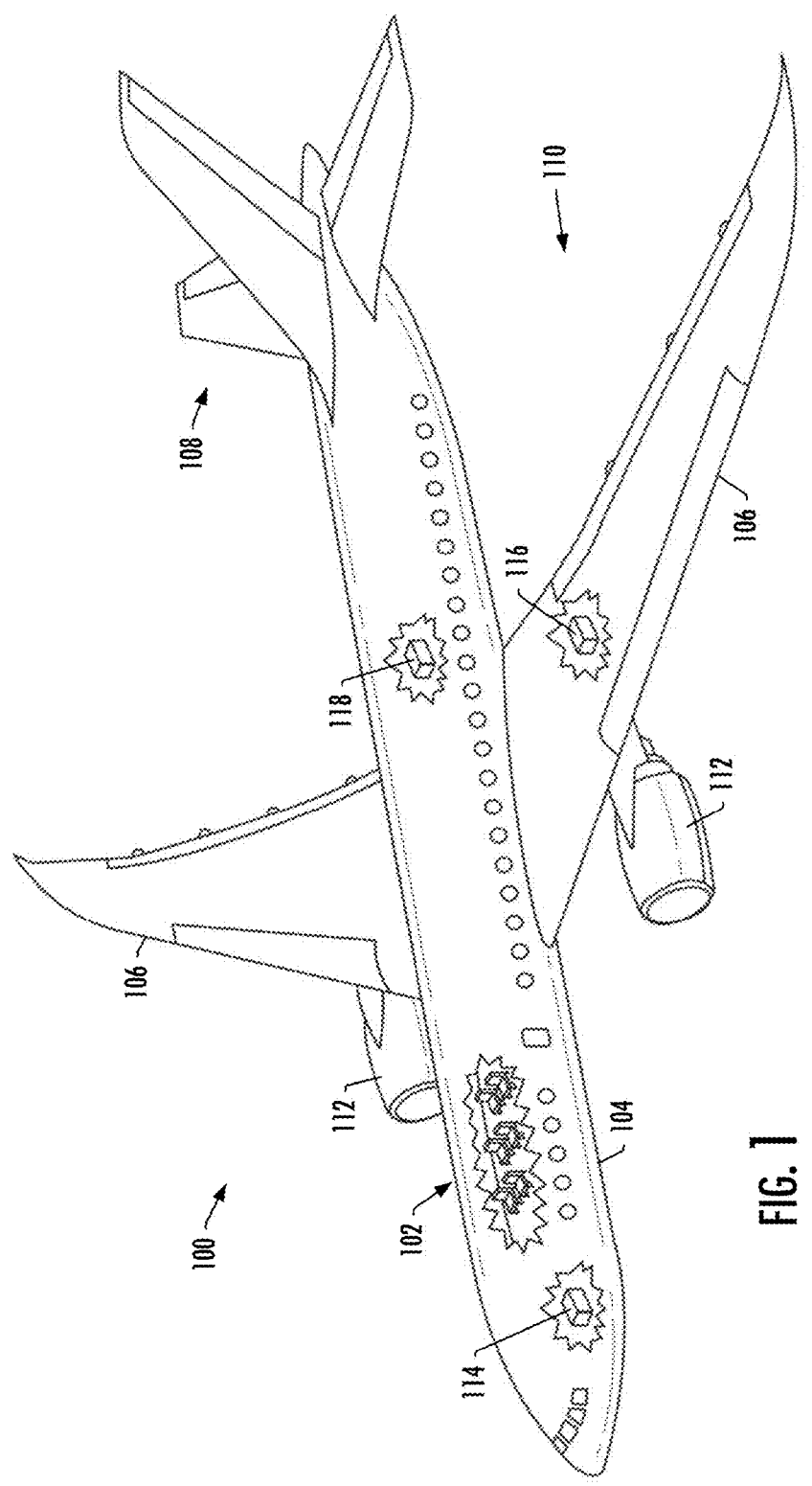
FIG. 1 illustrates an aircraft according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure are directed to aircraft fleet operation. FIG. 1 illustrates one type of aircraft 100 that may benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
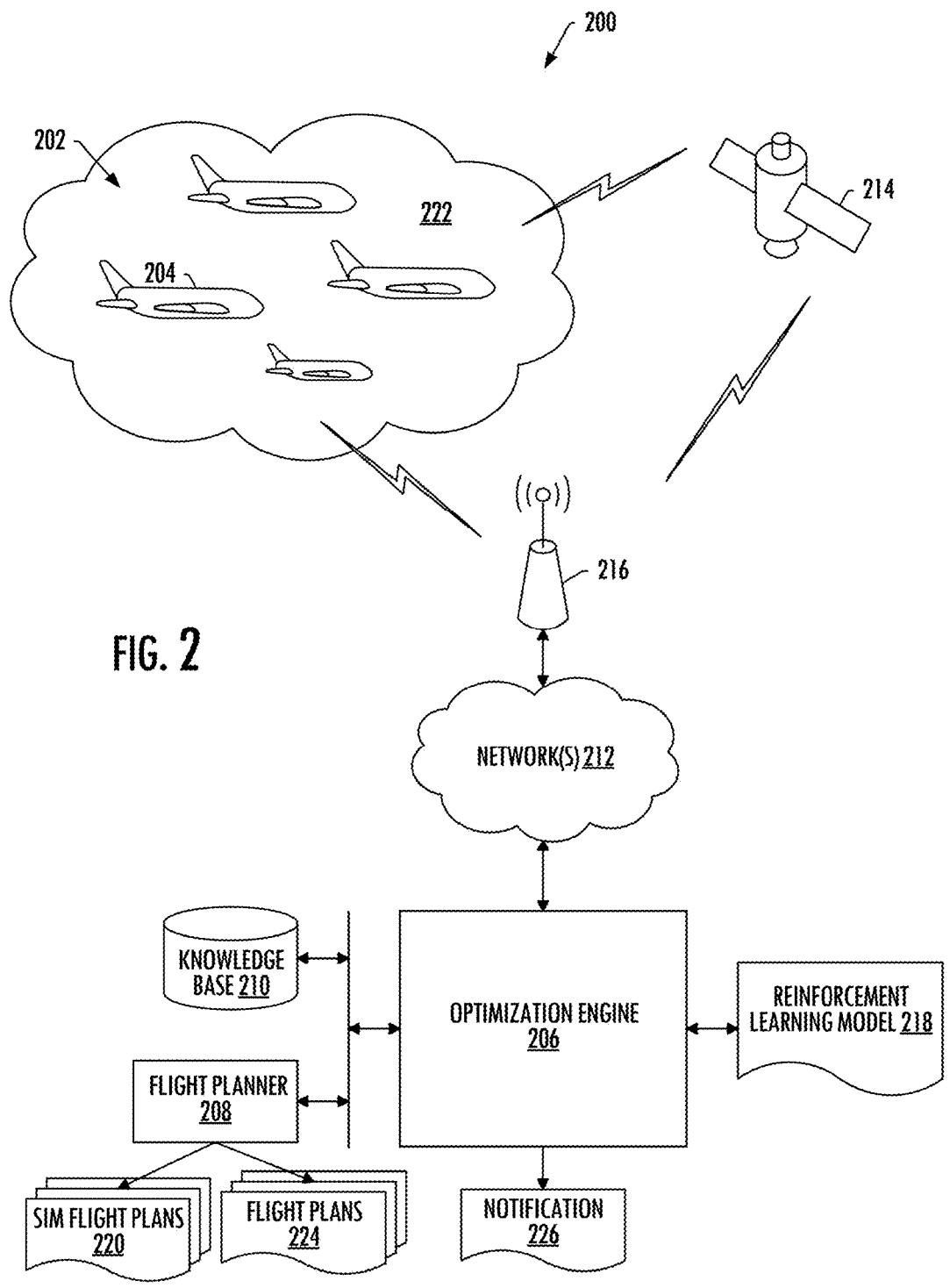
FIG. 2 illustrates a system for optimizing flights of a fleet of aircraft, according to example implementations of the present disclosure.
Figure 3A:
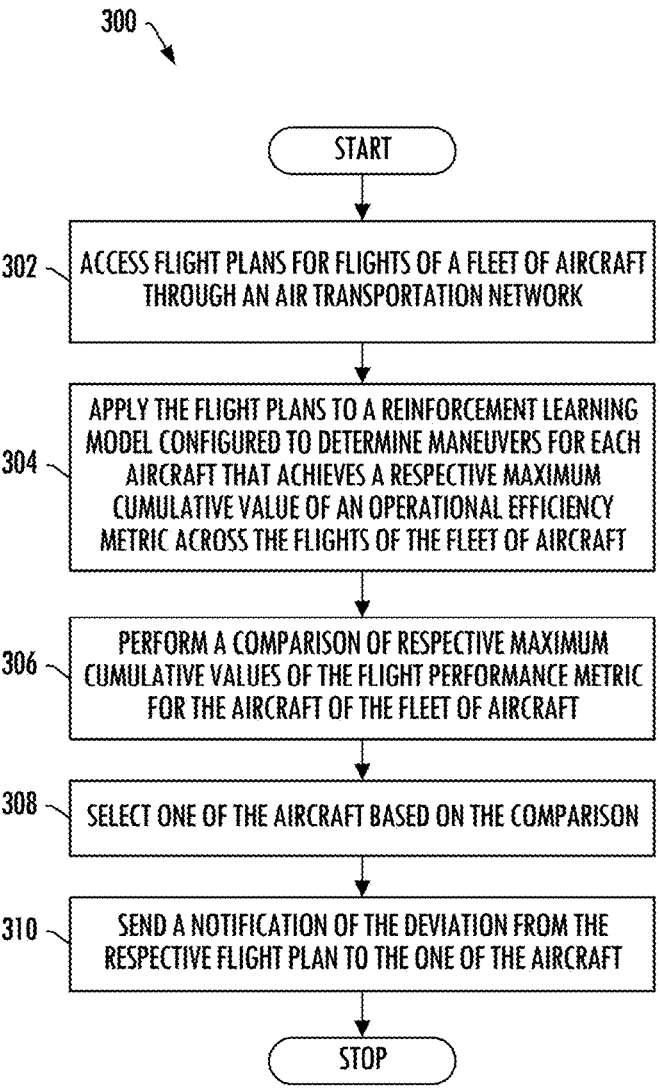

FIG. 2 illustrates a system 200 for optimizing flights of a fleet of aircraft 202 that include multiple aircraft 204 such as aircraft 100, according to some example implementations, according to example implementations of the present disclosure. In some examples, the fleet of aircraft are aircraft that have a common operator such as an airline, leasing company, military entity, service organization or the like.

The system 200 may include any of a number of different subsystems (each an individual system) for performing one or more functions or operations. As shown, in some examples, the system includes an optimization engine 206, a flight planner 208 and a knowledge base 210, which in some further examples may be located at an operations center for the fleet of aircraft. The subsystems including the optimization engine, flight planner and knowledge base may be co-located or directly coupled to one another, or in some examples, various ones of the subsystems may communicate with one another across one or more computer networks 212. Similarly, the aircraft 204 of the fleet of aircraft 202 may communicate with one or more of the subsystems across the one or more computer networks, which during flight may be facilitated by one or more artificial satellites 214, ground stations 216 and the like.

Although shown as part of the system 200, it should be understood that any one or more of the subsystems including the optimization engine 206, flight planner 208 and knowledge base 210 may function or operate as a separate system without regard to any of the other subsystems. It should also be understood that the system may include one or more additional or alternative subsystems than those shown in FIG. 2.

According to some example implementations of the present disclosure, the optimization engine 206 is configured to use a reinforcement learning model 218 to optimize flights of the fleet of aircraft 202. The reinforcement learning model is a sequential decision model learned through reinforcement learning. To train the reinforcement learning model, in some examples, the optimization engine is configured to access simulated flight plans 220 for simulated flights of the fleet of aircraft 202 through an air transportation network 222, each flight subject to compliance with air traffic control requirements. In some examples, the flight planner 208 is configured to generate the simulated flight plans, and with access to the knowledge base 210 that includes the air traffic control requirements.

The air transportation network 222 is a spatial network describing a structure that permits aircraft movement. The air transportation network may be expressed as a graph of nodes interconnected by edges. The nodes may be airports or cities, and the edges may be direct flight routes or flight connections between two airports or cities. In some examples, the air transportation network is worldwide; and in other examples, the air transportation network is defined for a geographical region.

The air traffic control requirements are constraints on flight plans and flights of the fleet of aircraft 202 through the air transportation network 222. These air traffic control requirements may include operational requirements of the fleet of aircraft, as well as regulatory requirements of air traffic control (ATC) that directs aircraft through the air transportation network. More particular examples of air traffic control requirements include traffic separation rules that maintain aircraft outside a minimum distance from other aircraft, terrain, obstacles and the like to reduce the risk of collision or issues caused by factors such as wake turbulence.

The optimization engine 206 is configured to train the reinforcement learning model 218 using the simulated flight plans as a training dataset. In this regard, the optimization engine is configured to train and thereby configure the reinforcement learning model to determine maneuvers for each aircraft 204 on a respective flight that achieves a respective maximum cumulative value of an operational efficiency metric across flights of the fleet of aircraft 202. The operational efficiency metric is a standard of measurement of operational efficiency of the fleet of aircraft. Examples of a suitable operational efficiency metric include one or more of fuel consumption, carbon emissions, flight time or the like. In some examples such as these, the maximum cumulative value may be expressed in terms of a maximum reduction in one or more of the fuel consumption, carbon emissions, flight time or the like.

Regardless of the exact manner according to which the reinforcement learning model 218 is trained or otherwise configured, the reinforcement model may then be deployed to optimize flights of the fleet of aircraft 202. In this regard, the optimization engine 206 is configured to access flight plans 224 for flights of the fleet of aircraft 202 through the air transportation network 222, each flight subject to compliance with the air traffic control requirements. In some examples, the flight planner 208 is configured to generate the flight plans, and with access to the knowledge base 210 that includes the air traffic control requirements.

The optimization engine 206 is configured to apply the flight plans 224 to the reinforcement learning model 218 configured to determine maneuvers for each aircraft 204 on a respective flight that achieves a respective maximum cumulative value of the operational efficiency metric across the flights of the fleet of aircraft 202. One or more of the maneuvers of the aircraft constitute a deviation from a respective flight plan that propagates to other aircraft of the fleet of aircraft. In this regard, the other aircraft of the fleet of aircraft are caused to perform responsive maneuvers to maintain compliance with the air traffic control requirements such as traffic separation rules. In some examples, flight plans indicate flight paths of the aircraft, and the deviation is a deviation from one or more of a planned altitude, speed or heading (e.g., temporary heading) of the aircraft on a respective flight path.

The optimization engine 206 is configured to perform a comparison of respective maximum cumulative values of the operational efficiency metric for the aircraft 204 of the fleet of aircraft 202, and select one of the aircraft based on the comparison. In some examples, the optimization engine is configured to rank the aircraft of the fleet of aircraft according to the respective maximum cumulative values, and compliance with the air traffic control requirements; and in some of these examples, the optimization engine is configured select the one of the aircraft based on the ranking.

The optimization engine 206 is configured to send a notification 226 of the deviation from the respective flight plan to the one of the aircraft 204; and in some examples, the notification also includes an explanation for selecting the one of the aircraft, such as an improvement in the operational efficiency metric for the fleet of aircraft 202. The notification may be sent as a suggestion to a pilot of the one of the aircraft to execute the deviation. The pilot may request the deviation with air traffic control, and then execute the deviation when the request is granted. And again, given the air traffic control requirements, other aircraft of the fleet of aircraft 202 may be caused to perform responsive maneuvers to maintain compliance with the air traffic control requirements. These responsive maneuvers may be communicated to the other aircraft by air traffic control.

In some examples, the optimization engine 206 is configured to optimize the flights of the fleet of aircraft 202 prior to at least the respective flight of the one of the aircraft 204. In some of these examples, the optimization engine is further configured to generate an updated flight plan for the one of the aircraft that includes the deviation from the respective flight plan. Or the optimization engine may communicate the deviation to the flight planner 208 that is configured to generate the updated flight plan. The notification 226 sent to the one of the aircraft, then, may include the updated flight plan.

In some examples, the optimization engine 206 is configured to optimize the flights of the fleet of aircraft 202 during at least the respective flight of the one of the aircraft 204. In particular, for example, the optimization engine is further configured to track respective positions and respective trajectories of those of the aircraft 204 of the fleet of aircraft 202 that are in-flight. In some of these examples, the optimization engine is configured to apply the flight plans 224 and the trajectories to the reinforcement learning model 218 configured to determine the maneuvers starting at the respective positions for each of those of the aircraft of the fleet of aircraft that are in-flight.

The optimization of the flights of the fleet of aircraft 202 may be repeated during the flights, as the respective positions and respective trajectories of those the aircraft 204 are tracked. Each time the optimization is repeated, the maneuvers for each aircraft may again be determined, and those maneuvers may include a new deviation. The comparison may be repeated, and the same or another one of the aircraft may be selected, and a new notification of the new deviation may be sent to that aircraft, which the aircraft may then execute, and which may propagate to the other aircraft of the fleet of aircraft.

The optimization engine 206 may be configured to track the respective positions and respective trajectories of the aircraft 204 of the fleet of aircraft 202 in any of a number of different manners. In some examples, the optimization engine is coupled to or otherwise in communication with one or more sensors such as those employing radar, lidar, infrared sensors, cameras and the like. Another example of a suitable sensor is an automatic, dependent surveillance-broadcast (ADS-B) receiver configured to receive ADS-B signals. ADS-B is a surveillance technology for tracking aircraft that uses satellite-based navigation technology and a broadcast communications data-link (ADS-B unit). An aircraft 202 that is an ADS-B capable aircraft may use a satellite-based navigation receiver to derive its precise position from satellites, and combine that position with state information such as velocity, altitude and flight number. The nearby aircraft may then broadcast this information via an ADS-B signal to other ADS-B capable systems, which may include the optimization engine.

FIGS. 3A, 3B, 3C, 3D and 3E are flowcharts illustrating various steps in a method 300 of optimizing flights of a fleet of aircraft, according to example implementations of the present disclosure. As shown at block 302 of FIG. 3A, the method includes accessing flight plans for flights of a fleet of aircraft through an air transportation network, each flight subject to compliance with air traffic control requirements.

The method 300 includes applying the flight plans to a reinforcement learning model configured to determine maneuvers for each aircraft on a respective flight that achieves a respective maximum cumulative value of an operational efficiency metric across the flights of the fleet of aircraft, as shown at block 304. In this regard, one or more of the maneuvers constituting a deviation from a respective flight plan that propagates to other aircraft of the fleet of aircraft that are caused to perform responsive maneuvers to maintain compliance with the air traffic control requirements. In some examples, the flight plans indicate flight paths of the aircraft of the fleet of aircraft, and the deviation is from one or more of a planned altitude, speed or heading of the aircraft on a respective flight path.

The method 300 includes performing a comparison of respective maximum cumulative values of the operational efficiency metric for the aircraft of the fleet of aircraft, as shown at block 306. And the method includes selecting one of the aircraft based on the comparison, and sending a notification of the deviation from the respective flight plan to the one of the aircraft, as shown at blocks 308 and 310. In some examples, sending the notification at block 310 includes sending the notification that also includes an explanation for selecting the one of the aircraft.

In some examples, the method 300 further includes generating simulated flight plans for simulated flights of the fleet of aircraft, and training the reinforcement learning model using the simulated flight plans as a training dataset, as shown at blocks 312 and 314 of FIG. 3B.

In some examples, performing the comparison at block 306 includes ranking the aircraft of the fleet of aircraft according to the respective maximum cumulative values, and compliance with the air traffic control requirements, as shown at block 316 of FIG. 3C. In some of these examples, the one of the aircraft is selected at block 308 based on the ranking.

In some examples, the flight plans are accessed at block 302 and applied at block 304 to the reinforcement learning model, the comparison is performed at block 306, and the one of the aircraft is selected at block 308, prior to at least the respective flight of the one of the aircraft. In some of these examples, the method 300 further incudes generating an updated flight plan for the one of the aircraft that includes the deviation from the respective flight plan, as shown at block 318 of FIG. 3D. Also in some of these examples, sending the notification at block 310 includes sending the updated flight plan to the one of the aircraft.

In some examples, the flight plans are accessed at block 302 and applied at block 304 to the reinforcement learning model, the comparison is performed at block 306, the one of the aircraft is selected at block 308, and the notification of the deviation is sent to the one of the aircraft at block 310, during at least the respective flight of the one of the aircraft.

In some examples, the method 300 further includes tracking at least respective positions of those of the aircraft of the fleet of aircraft that are in-flight, as shown at block 320 of FIG. 3E. In some of these examples, applying the flight plans to the reinforcement learning model at block 304 includes applying the flight plans and the trajectories to the reinforcement learning model configured to determine the maneuvers starting at the respective positions for each of those of the aircraft of the fleet of aircraft that are in-flight.

According to example implementations of the present disclosure, the system 200 and its subsystems including the optimization engine 206, the flight planner 208 and the knowledge base 210 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
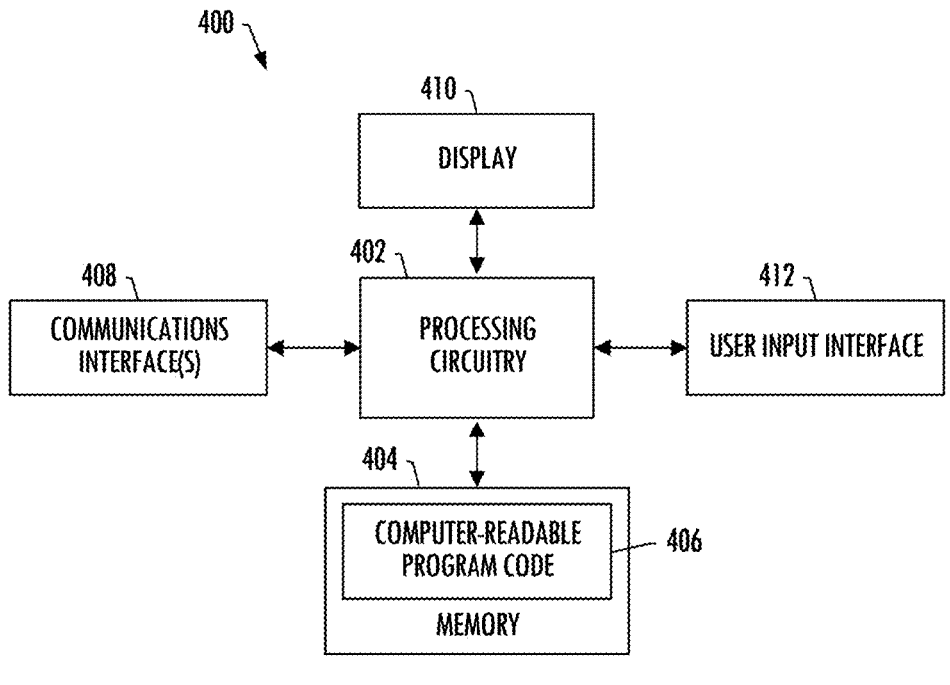
FIG. 4 illustrates an apparatus according to some example implementations.

FIG. 4 illustrates an apparatus 400 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for optimizing flights of a fleet of aircraft, the apparatus comprising:

a memory configured to store computer-readable program code; and processing circuitry configured to access the memory, and execute the computer-readable program code to cause the apparatus to at least:

access flight plans for flights of a fleet of aircraft through an air transportation network, each flight subject to compliance with air traffic control requirements;

track respective positions and respective trajectories of one or more aircraft of the fleet of aircraft that are currently in-flight;

apply the flight plans and the respective positions and respective trajectories of the one or more aircraft of the fleet of aircraft that are currently in-flight to a reinforcement learning model configured to determine maneuvers starting at the respective positions and respective trajectories of the one or more aircraft of the fleet of aircraft that are in-flight or starting at respective beginnings of the flights of the fleet of aircraft that are not in-flight that achieves a respective maximum cumulative value of an operational efficiency metric across the flights of the fleet of aircraft, one or more of the maneuvers constituting a deviation from a respective flight plan that propagates to other aircraft of the fleet of aircraft that are caused to perform responsive maneuvers to maintain compliance with the air traffic control requirements;

perform a comparison of respective maximum cumulative values of the operational efficiency metric for the aircraft of the fleet of aircraft;

select one of the aircraft based on the comparison; and send a notification of the deviation from the respective flight plan to the one of the aircraft.

2. The apparatus of claim 1, wherein the processing circuitry is configured to execute the computer-readable program code to cause the apparatus to further at least:

generate simulated flight plans for simulated flights of the fleet of aircraft; and train the reinforcement learning model using the simulated flight plans as a training dataset.

3. The apparatus of claim 1, wherein the flight plans indicate flight paths of the aircraft of the fleet of aircraft, and the deviation is from one or more of a planned altitude, speed or heading of the aircraft on a respective flight path.

4. The apparatus of claim 1, wherein the processing circuitry is configured to access the memory, and execute the computer-readable program code to cause the apparatus to at least:

rank the aircraft of the fleet of aircraft according to the respective maximum cumulative values, and compliance with the air traffic control requirements, and wherein the one of the aircraft is selected based on the ranking.

5. The apparatus of claim 1, wherein the flight plans are accessed and applied to the reinforcement learning model, the comparison is performed, and the one of the aircraft is selected, prior to at least the respective flight of the one of the aircraft, and wherein the processing circuitry is configured to execute the computer-readable program code to cause the apparatus to further generate an updated flight plan for the one of the aircraft that includes the deviation from the respective flight plan, and the apparatus caused to send the notification includes the apparatus caused to send the updated flight plan to the one of the aircraft.

6. The apparatus of claim 1, wherein the flight plans and the respective positions and respective trajectories of the one or more aircraft of the fleet of aircraft that are currently in-flight are repeatedly applied to the reinforcement learning model throughout the flights of the one or more aircraft to determine updated maneuvers that achieve the respective maximum cumulative values of the operational efficiency metric across the flights of the fleet of aircraft.

7. A method of optimizing flights of a fleet of aircraft, the method comprising:

accessing flight plans for flights of a fleet of aircraft through an air transportation network, each flight subject to compliance with air traffic control requirements;

tracking respective positions and respective trajectories of one or more aircraft of the fleet of aircraft that are currently in-flight;

applying the flight plans and the respective positions and respective trajectories of the one or more aircraft of the fleet of aircraft that are currently in-flight to a reinforcement learning model configured to determine maneuvers starting at the respective positions and respective trajectories of the one or more aircraft of the fleet of aircraft that are in-flight or starting at respective beginnings of the flights of the fleet of aircraft that are not in-flight that achieves a respective maximum cumulative value of an operational efficiency metric across the flights of the fleet of aircraft, one or more of the maneuvers constituting a deviation from a respective flight plan that propagates to other aircraft of the fleet of aircraft that are caused to perform responsive maneuvers to maintain compliance with the air traffic control requirements;

performing a comparison of respective maximum cumulative values of the operational efficiency metric for the aircraft of the fleet of aircraft;

selecting one of the aircraft based on the comparison; and sending a notification of the deviation from the respective flight plan to the one of the aircraft.

8. The method of claim 7 further comprising:

generating simulated flight plans for simulated flights of the fleet of aircraft; and training the reinforcement learning model using the simulated flight plans as a training dataset.

9. The method of claim 7, wherein the flight plans indicate flight paths of the aircraft of the fleet of aircraft, and the deviation is from one or more of a planned altitude, speed or heading of the aircraft on a respective flight path.

10. The method of claim 7, wherein performing the comparison includes ranking the aircraft of the fleet of aircraft according to the respective maximum cumulative values, and compliance with the air traffic control requirements, and wherein the one of the aircraft is selected based on the ranking.

11. The method of claim 7, wherein sending the notification includes sending the notification that also includes an explanation for selecting the one of the aircraft.

12. The method of claim 7, wherein the flight plans are accessed and applied to the reinforcement learning model, the comparison is performed, and the one of the aircraft is selected, prior to at least the respective flight of the one of the aircraft, and wherein the method further comprises generating an updated flight plan for the one of the aircraft that includes the deviation from the respective flight plan, and sending the notification includes sending the updated flight plan to the one of the aircraft.

13. The method of claim 7, wherein the flight plans and the respective positions and respective trajectories of the one or more aircraft of the fleet of aircraft that are currently in-flight are repeatedly applied to the reinforcement learning model throughout the flights of the one or more aircraft to determine updated maneuvers that achieve the respective maximum cumulative values of the operational efficiency metric across the flights of the fleet of aircraft.

14. A computer-readable storage medium for optimizing flights of a fleet of aircraft, the computer-readable storage medium being non-transitory and having computer-readable program code stored therein that, in response to execution by processing circuitry, causes an apparatus to at least:

access flight plans for flights of a fleet of aircraft through an air transportation network, each flight subject to compliance with air traffic control requirements;

track respective positions and respective trajectories of one or more aircraft of the fleet of aircraft that are currently in-flight;

apply the flight plans and the respective positions and respective trajectories of the one or more aircraft of the fleet of aircraft that are currently in-flight to a reinforcement learning model configured to determine maneuvers starting at the respective positions and respective trajectories of the one or more aircraft of the fleet of aircraft that are in-flight or starting at respective beginnings of the flights of the fleet of aircraft that are not in-flight that achieves a respective maximum cumulative value of an operational efficiency metric across the flights of the fleet of aircraft, one or more of the maneuvers constituting a deviation from a respective flight plan that propagates to other aircraft of the fleet of aircraft that are caused to perform responsive maneuvers to maintain compliance with the air traffic control requirements;

perform a comparison of respective maximum cumulative values of the operational efficiency metric for the aircraft of the fleet of aircraft;

select one of the aircraft based on the comparison; and send a notification of the deviation from the respective flight plan to the one of the aircraft.

15. The computer-readable storage medium of claim 14, wherein the computer-readable storage medium has further computer-readable program code stored therein that, in response to execution by the processing circuitry, causes the apparatus to further at least:

generate simulated flight plans for simulated flights of the fleet of aircraft; and train the reinforcement learning model using the simulated flight plans as a training dataset.

16. The computer-readable storage medium of claim 14, wherein the flight plans indicate flight paths of the aircraft of the fleet of aircraft, and the deviation is from one or more of a planned altitude, speed or heading of the aircraft on a respective flight path.

17. The computer-readable storage medium of claim 14, wherein the apparatus caused to perform the comparison includes the apparatus caused to rank the aircraft of the fleet of aircraft according to the respective maximum cumulative values, and compliance with the air traffic control requirements, and wherein the one of the aircraft is selected based on the ranking.

18. The computer-readable storage medium of claim 14, wherein the flight plans are accessed and applied to the reinforcement learning model, the comparison is performed, and the one of the aircraft is selected, prior to at least the respective flight of the one of the aircraft, and wherein the computer-readable storage medium has further computer-readable program code stored therein that, in response to execution by the processing circuitry, causes the apparatus to further generate an updated flight plan for the one of the aircraft that includes the deviation from the respective flight plan, and the apparatus caused to send the notification includes the apparatus caused to send the updated flight plan to the one of the aircraft.

19. The computer-readable storage medium of claim 14, wherein the flight plans are accessed and applied to the reinforcement learning model, the comparison is performed, the one of the aircraft is selected, and the notification of the deviation is sent to the one of the aircraft, during at least the respective flight of the one of the aircraft.

20. The computer-readable storage medium of claim 14, wherein the flight plans and the respective positions and respective trajectories of the one or more aircraft of the fleet of aircraft that are currently in-flight are repeatedly applied to the reinforcement learning model throughout the flights of the one or more aircraft to determine updated maneuvers that achieve the respective maximum cumulative values of the operational efficiency metric across the flights of the fleet of aircraft.

* * * * *